United States Patent
Lee

(10) Patent No.: US 9,447,958 B2
(45) Date of Patent: Sep. 20, 2016

(54) DISPLAY DEVICE

(71) Applicant: SAMSUNG ELECTRONICS CO., LTD., Suwon-si (KR)

(72) Inventor: Kye Hoon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 27 days.

(21) Appl. No.: 14/575,375

(22) Filed: Dec. 18, 2014

(65) Prior Publication Data
US 2015/0167952 A1    Jun. 18, 2015

(30) Foreign Application Priority Data

Dec. 18, 2013  (KR) ......................... 10-2013-0158476

(51) Int. Cl.
*F21V 7/04* (2006.01)
*F21V 29/70* (2015.01)
(Continued)

(52) U.S. Cl.
CPC ............... *F21V 29/70* (2015.01); *F21V 15/01* (2013.01); *F21V 19/0015* (2013.01); *F21V 29/83* (2015.01); *G02B 6/0073* (2013.01); *G02B 6/0085* (2013.01); *G02B 6/0091* (2013.01); *G02F 1/133603* (2013.01); *G02F 1/133608* (2013.01); *G02F 1/133615* (2013.01);
(Continued)

(58) Field of Classification Search
CPC ........ F21V 29/70; F21V 29/83; F21V 15/01; F21V 19/0015; G02B 6/0073; G02B 6/0085; G02B 6/0091; G02F 1/133603; G02F 1/133608; G02F 1/133615; G02F 2001/133314; G02F 2001/133612; G02F 2001/133628
See application file for complete search history.

(56) References Cited

U.S. PATENT DOCUMENTS

| 5,786,665 A | * | 7/1998 | Ohtsuki ............... G02B 6/0021 313/113 |
| 2001/0002145 A1 | * | 5/2001 | Lee ................... G02F 1/133308 349/58 |

(Continued)

FOREIGN PATENT DOCUMENTS

| EP | 2 645 159 A1 | 10/2013 |
| EP | 2 667 247 A1 | 11/2013 |

(Continued)

OTHER PUBLICATIONS

Communication, Issued by the International Searching Authority, Dated Feb. 27, 2015, In counterpart International Application No. PCT/KR2014/012406.

(Continued)

*Primary Examiner* — Peggy Neils
*Assistant Examiner* — Alexander Garlen
(74) *Attorney, Agent, or Firm* — Sughrue Mion, PLLC

(57) ABSTRACT

Provided is a display device that is capable of preventing heat generated in a plurality of light emitting diodes (LEDs) from being excessively transferred to a top chassis so that the occurrence of a safety accident and poor quality of a display panel can be prevented. The display device includes: a display panel on which an image is formed; a top chassis in front of the display panel and having an opening through which the display panel is exposed; a plurality of LEDs that provide light to the display panel; a printed circuit board (PCB) on which the plurality of LEDs are mounted; and a bottom chassis behind the PCB, wherein the PCB and the bottom chassis are arranged such that an air gap is between the PCB and an inner side surface of the bottom chassis.

24 Claims, 7 Drawing Sheets

(51) Int. Cl.

| | | |
|---|---|---|
| *F21V 19/00* | (2006.01) | |
| *F21V 8/00* | (2006.01) | |
| *G02F 1/1335* | (2006.01) | |
| *F21V 15/01* | (2006.01) | |
| *F21V 29/83* | (2015.01) | |
| *G02F 1/1333* | (2006.01) | |

(52) U.S. Cl.
CPC ............ *G02F2001/133314* (2013.01); *G02F 2001/133612* (2013.01); *G02F 2001/133628* (2013.01)

(56) References Cited

U.S. PATENT DOCUMENTS

| | | | |
|---|---|---|---|
| 2002/0140880 A1* | 10/2002 | Weindorf | G02B 6/0023 349/70 |
| 2006/0012286 A1 | 1/2006 | Cull et al. | |
| 2006/0110949 A1 | 5/2006 | Jee et al. | |
| 2010/0085502 A1* | 4/2010 | Yen | G02F 1/133615 349/58 |
| 2010/0157199 A1 | 6/2010 | Kim | |
| 2011/0122339 A1* | 5/2011 | Hamada | G02B 6/0085 349/62 |
| 2011/0134371 A1* | 6/2011 | Shimojoh | G02B 6/0083 349/65 |
| 2012/0140443 A1 | 6/2012 | Kim et al. | |
| 2012/0229726 A1 | 9/2012 | Kim | |

FOREIGN PATENT DOCUMENTS

| | | |
|---|---|---|
| KR | 10-2011-0056966 A | 5/2011 |
| WO | 2012070331 A1 | 5/2012 |
| WO | 2012073787 A1 | 6/2012 |

OTHER PUBLICATIONS

Communication, Issued by the European Patent Office, Dated Apr. 23, 2015, In counterpart European Application No. 14197909.6.

* cited by examiner

DISPLAY DEVICE

CROSS-REFERENCE TO RELATED APPLICATION

This application claims priority to Korean Patent Application No. 10-2013-0158476, filed on Dec. 18, 2013 in the Korean Intellectual Property Office, the disclosure of which is incorporated herein by reference in its entirety.

BACKGROUND

1. Field

Apparatuses and methods consistent with exemplary embodiments relate to a display device that is capable of preventing a rise in temperature of a top chassis.

2. Description of the Related Art

Display apparatuses are apparatuses that display data information, such as characters or figures, visually. A display apparatus may include a liquid crystal display (LCD) device and a frame on which the LCD device is mounted.

Since the LCD device is a passive optical device that is not a self-emitting device, the LCD device may display an image using a backlight assembly attached onto a rear surface of a display panel of the LCD device. The size and luminescence efficiency of the LCD device vary according to the structure of the backlight assembly, which greatly affects mechanical and optical characteristics of the whole LCD device.

The backlight assembly may be classified as a direct type backlight assembly and an edge type backlight assembly according to the position of a light source. In the direct type backlight assembly, a light source is placed on a rear surface of a liquid crystal panel, and the light source emits light directly toward the entire surface of the liquid crystal panel. In the edge type backlight assembly, a light source is provided on at least one edge of the rear of the liquid crystal panel.

The direct type backlight assembly has advantages that brightness can be improved and an emission surface can be enlarged due to several light sources placed in the direct type backlight assembly, in comparison with the edge type backlight assembly. Power consumption of the direct type backlight assembly increases proportionately to the number of light sources. Furthermore, when the direct type backlight assembly is slimmed, shapes of light sources may project, and uniformity is lowered, which may cause a limitation in slimness. Thus, the edge type backlight assembly may instead be used in implementing a slim product and reducing power consumption.

SUMMARY

Therefore, it is an aspect of an exemplary embodiment to provide a display device that is capable of preventing an excessive rise in temperature of a top chassis of the display device.

Additional aspects will be set forth in part in the description which follows and, in part, will be obvious from the description, or may be learned by practice of exemplary embodiments.

According to an aspect of an exemplary embodiment, there is provided a display device including: a display panel on which an image is formed; a top chassis in front of the display panel and having an opening through which the display panel is exposed; a plurality of light emitting diodes (LEDs) configured to provide light to the display panel; a printed circuit board (PCB) on which the plurality of LEDs are mounted; and a bottom chassis behind the PCB, wherein the PCB and the bottom chassis are arranged such that an air gap is between the PCB and an inner side surface of the bottom chassis.

At least one side of the PCB facing the inner side surface of the bottom chassis may be spaced apart from the inner side surface of the bottom chassis.

An incline surface may be formed on at least one side of the PCB, and the air gap may be between the bottom chassis and the incline surface.

A side of the PCB that faces the inner side surface of the bottom chassis comprises an extension portion that extends laterally toward the inner side surface of the bottom chassis, and another portion that is farther from the inner side surface of the bottom chassis than the extension portion, and which forms a step with the extension portion.

The plurality of LEDs may be mounted on a front surface of the extension portion that faces the display panel.

A side surface of the extension portion that faces the inner side surface of the bottom chassis may be spaced apart from the inner side surface of the bottom chassis.

The air gap may be formed between the bottom chassis and a rear surface of the extension portion, opposite a front surface of the extension portion that faces the display panel.

A spacer formed of an insulating material may be in the air gap.

The spacer may include a resin-based material, such as plastic or rubber.

A heat sink may be behind the PCB, farther from the display panel than the PCB.

A heat reflection coating layer may be at a front surface of the heat sink that faces the display panel.

A thickness of the PCB may be in a range of 2.5 mm to 3.2 mm.

A heat dissipation sheet may be behind the bottom chassis.

The top chassis may include a bezel that surrounds front edges of the display panel and top sides that are bent backward from an end of the bezel towards the bottom chassis.

At least a portion of the top sides may contact the bottom chassis.

According to an aspect of another exemplary embodiment, there is provided a display device including: a display panel on which an image is formed; a plurality of light emitting diodes (LEDs) to a left side or a right side of a rear of the display panel and configured to provide light to the display panel; a printed circuit board (PCB) on which the plurality of LEDs are mounted; a top chassis in front of the display panel and having an opening through which the display panel is exposed; a bottom chassis behind the PCB and contacting a portion of the top chassis; and a heat dissipation sheet behind the bottom chassis, wherein at least a portion of a side of the PCB that faces an inner side surface of the bottom chassis does not contact the inner side surface of the bottom chassis so that an air gap is formed between the inner side surface of the bottom chassis and the PCB.

The PCB may be formed of a metal material having high thermal conductivity.

A spacer formed of a resin material and having low thermal conductivity may be in the air gap.

A heat sink may be behind the PCB, farther from the display panel than the PCB.

A heat reflection coating layer may be at a front surface of the heat sink that faces the display panel.

According to an aspect of another exemplary embodiment, there is provided a display device including: a plurality of light emitting diodes (LEDs) configured to provide light to the display panel; a printed circuit board (PCB) on which the plurality of LEDs are mounted; and a bottom chassis behind the PCB, wherein the PCB and the bottom chassis are arranged such that an air gap is between the PCB and an inner side surface of the bottom chassis.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF EXEMPLARY EMBODIMENTS

Figure 1:
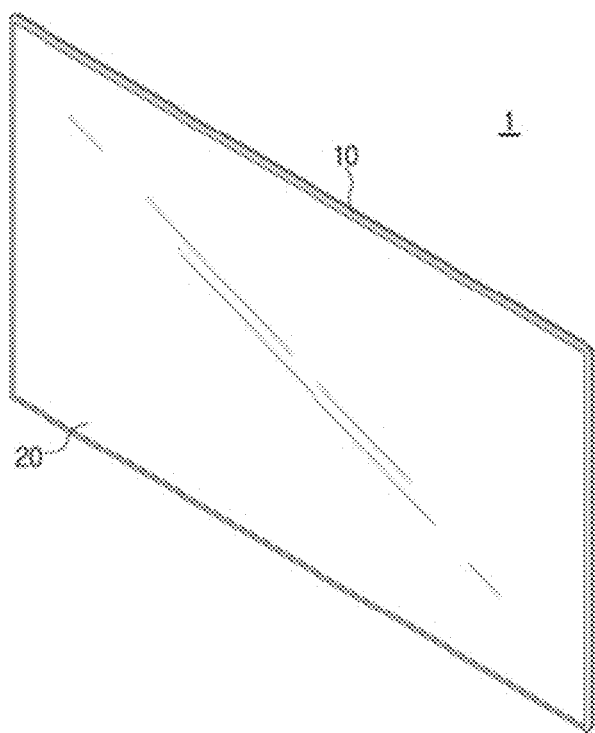
FIG. 1 is a perspective view of a display device in accordance with an exemplary embodiment.

Reference will now be made in detail to exemplary embodiments, examples of which are illustrated in the accompanying drawings, wherein like reference numerals refer to like elements throughout.

It will be understood that, although the terms first, second, etc., may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items. Furthermore, it is understood that expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," "facing" versus "directly facing," etc.).

The terminology used herein is for the purpose of describing particular exemplary embodiments and is not intended to be limiting of the inventive concept. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Figure 2:
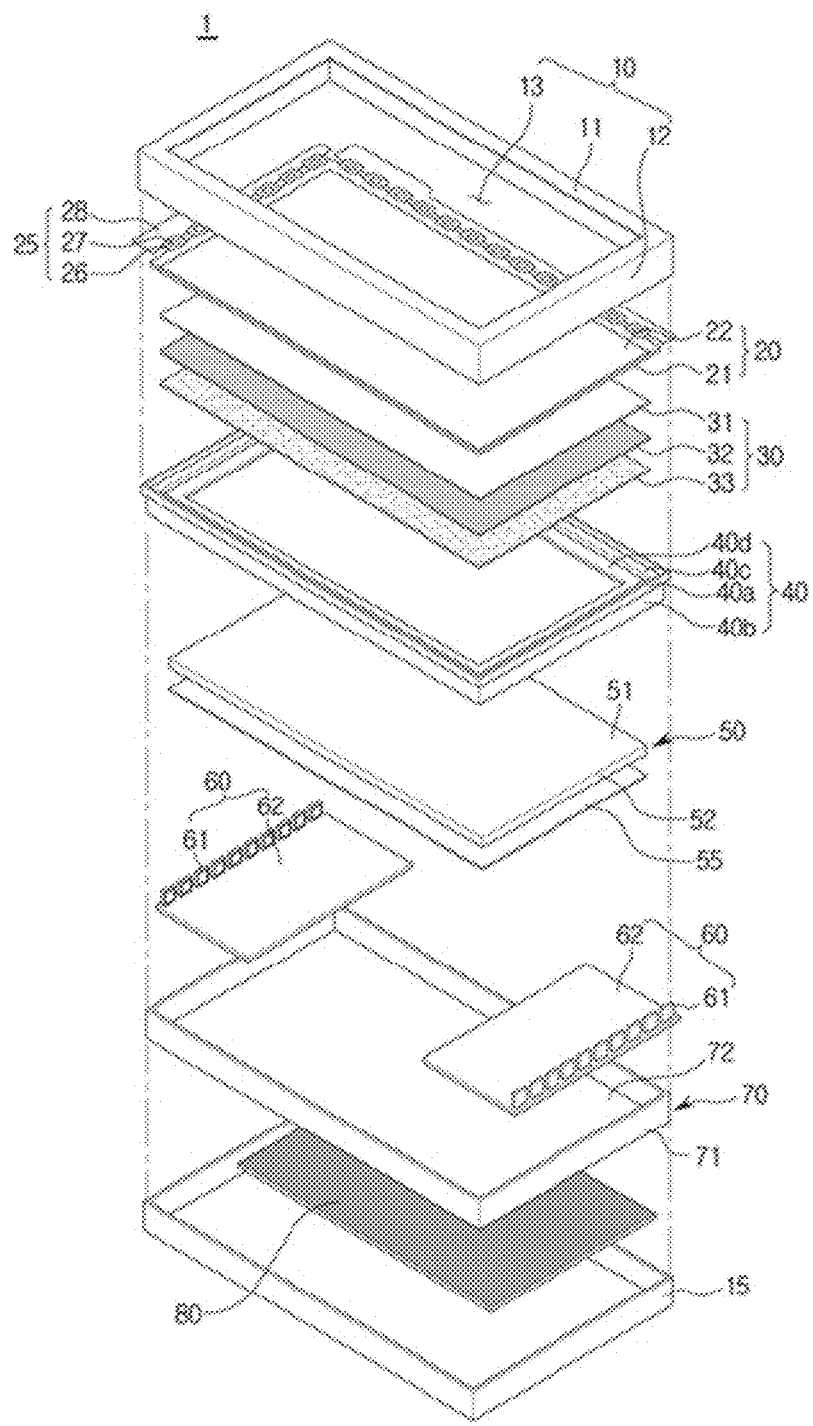
FIG. 2 is an exploded perspective view of the display device illustrated in FIG. 1.

FIG. 1 is a perspective view of a display device 1 in accordance with an exemplary embodiment, and FIG. 2 is an exploded perspective view of the display device 1 illustrated in FIG. 1.

Referring to FIGS. 1 and 2, a display device 1 includes a top chassis 10, a display panel 20, a backlight 60 (e.g., backlight assembly or backlight unit), and a bottom chassis 70. The top chassis 10 is disposed in front of the display panel 20, i.e., from a perspective of a viewer of the display device 1. The backlight 60 is disposed behind the display panel 20 and is spaced apart from the display panel 20 by a predetermined gap. The bottom chassis 70 may be disposed behind the display panel 20 and the backlight 60.

A middle mold 40 may be provided between the display panel 20 and the backlight 60. The middle mold 40 causes the display panel 20 to be supported in a state in which the display panel 20 is spaced apart from the backlight 60 by a predetermined gap. A heat dissipation sheet 80 may be disposed behind the bottom chassis 70. A rear cover 15 that is a rear exterior of the display device 1 may be provided behind the bottom chassis 70.

A plurality of optical sheets 30 may be provided behind the display panel 20. A light guide panel 50 may be placed behind the plurality of optical sheets 30. A reflection sheet 55 may be disposed behind the light guide panel 50.

The plurality of optical sheets 30 may include a protective film 31, a prism film 32, and a diffusion film 33. The protective film 31 is disposed in front of the prism film 32 and protects the prism film 32 that is sensitive to a scratch, such as from dust.

A triangular prism may be disposed on a front surface of the prism film 32. Light diffused by the diffusion film 33 may be collected by the prism film 32 in a direction perpendicular to a rear surface of the front display panel 20. One or more pieces of prism film 32 may be used. Light that passes through the prism film 32 may proceed perpendicularly to the display panel 20 so that the display panel 20 has uniform brightness.

A bead-shaped coating layer may be formed on the diffusion film 33. Light that passes through the light guide panel 50 may be diffused by the diffusion film 33 and may be supplied to the display panel 20.

The light guide panel 50 may cause light emitted from a plurality of light emitting diodes (LEDs) 61 to be uniformly supplied to the diffusion film 33. The light guide panel 50 may be formed of an acryl-based resin, such as polymethylmethacrylate (PMMA), or polymethylstyrene.

The light guide panel 50 may include an exit surface 51 and an incidence surface 52. The exit surface 51 may be placed behind the diffusion film 33 and may face a surface of the diffusion film 33. The incidence surface 52 may be provided at a lateral cross-section of the light guide panel 50, and light emitted from the LEDs 61 may be incident on the incidence surface 52.

The reflection sheet 55 may be disposed behind the light guide panel 50. Light emitted by the reflection sheet 55 through a bottom surface of the light guide panel 50 may be guided toward the light guide panel 50 again. The reflection sheet 55 may be formed of a plastic material, such as polyethylene terephthalate (PET) or polycarbonate (PC).

The backlight 60 includes the plurality of LEDs 61 and a printed circuit board (PCB) 62. The plurality of LEDs 61 may supply light to the light guide panel 50. The plurality of LEDs 61 may be mounted on the PCB 62.

The plurality of LEDs 61 may be mounted on the PCB 62 to protrude from one surface of the PCB 62. The plurality of LEDs 61 may be disposed on a surface of the PCB 62 and may be spaced apart from each other by a predetermined gap. The plurality of LEDs 61 may be provided on one or more sides of the reflection sheet, e.g., to the left and to the right of the reflection sheet 55. The plurality of LEDs 61 may radiate light in a direction perpendicular to a direction in which the plurality of LEDs 61 protrude from the PCB 62, i.e., in a direction parallel to a front surface of the PCB on which the plurality of LEDs are mounted.

The PCB 62 may be placed behind the reflection sheet 55. The PCB 62 may be fixed to the bottom chassis 70 using a fastening member, such as a screw, or an adhesion member, such as a double-sided tape. A backside of a surface of the PCB 62, on which the plurality of LEDs 61 are mounted, may be fixed onto a bottom surface 72 (which is front-facing) of the bottom chassis 70.

The LEDs 61 may be a plurality of LEDs that emit white light or a combination of a plurality of LEDs that emit red, green, and blue lights.

The display panel 20 may include a thin film transistor (TFT) substrate 21 and a color filter substrate 22 placed at one side of the TFT substrate 21. A liquid crystal layer may be provided between the TFT substrate 21 and the color filter substrate 22.

A driver 25 (e.g., driving unit) for applying driving signals may be disposed at one side of the TFT substrate 21. The driver 25 may include a flexible printed circuit board (FPCB) 26, a driving chip 27, and a circuit board 28. The driving chip 27 may be mounted on one side of the FPCB 26. The circuit board 28 may be connected to the other side of the FPCB 26.

The FPCB 26 may be provided in a manner of a chip on film (COF) in which a chip device is mounted on a base film. The FPCB 26 may have a shape of a tape carrier package (TCP) or a chip on glass (COG) using a tape automated bonding (TAB) technique.

The display panel 20 may constitute a screen by adjusting the arrangement of the liquid crystal layer. An image may be displayed on the display panel 20 that is a non-emitting device using light supplied from the backlight 60.

The top chassis 10 may include a bezel 11 and top sides 12. The bezel 11 may surround front edges of the display panel 20. The top sides 12 may be provided to be bent backward from an end of the bezel 11. At least a portion of the top sides 12 may contact the bottom chassis 70. For example, at least a portion of the top sides 12 may cover outer side surfaces of sides 71 of the bottom chassis 70 (i.e., bottom sides 71).

An opening 13 through which the display panel 20 may be exposed, may be formed in the top chassis 10. The entire effective display area of the display panel 20 in which a screen is actually displayed, may be exposed through the opening 13.

The bottom chassis 70 may include the bottom sides 71 and the bottom surface 72. The bottom sides 71 may protrude forward toward the front (i.e., toward the top chassis 10) along a circumference of the bottom surface 72 and may extend. The backlight 60 may be mounted on the bottom surface 72. The heat dissipation sheet 80 may be disposed behind the bottom surface 72 of the bottom chassis 70.

The middle mold 40 may include a front extension portion 40a, a rear extension portion 40b, and support portions 40c and 40d. The front extension portion 40a may extend toward the front of the middle mold 40. An outer side surface of the front extension portion 40a may be formed as a continuation or as the same surface as outer side surfaces of the bottom sides 71 of the bottom chassis 70.

The rear extension portion 40b may extend toward the rear of the middle mold 40. An outer side surface of the rear extension portion 40b of the middle mold 40 may contact inner side surfaces of the bottom sides 71 of the bottom chassis 70.

The support portions 40c and 40d may extend from the front extension portion 40a of the middle mold 40 inwards. The support portions 40c and 40d may include a first support portion 40c and a second support portion 40d. The second support portion 40d may extend from the first support portion 40c inwards. The second support portion 40d may extend from the first support portion 40c inwards while forming a step height between the first support portion 40c and the second support portion 40d.

At least a part of the display panel 20 may be supported by the first support portion 40c. At least a part of the optical sheets 30 may be supported by the second support portion 40d.

The LEDs 61 may emit light and dissipate heat simultaneously. The PCB 62 may supply driving signals to the LEDs 61 and may transfer heat generated in the LEDs 61 to the outside. That is, heat generated in the LEDs 61 may be transferred to the bottom chassis 70 through the PCB 62. In order to improve heat transfer efficiency, the PCB 62 may be formed of metal having high thermal conductivity. For example, the PCB 62 may be formed of a metal material, such as aluminum or copper.

The heat dissipation sheet 80 may be mounted behind the bottom chassis 70. A heat dissipation operability of the bottom chassis 70 may be improved through the heat dissipation sheet 80.

Heat generated in the LEDs 61 included in the display device 1 may be transferred to the PCB 62. Heat transferred to the PCB 62 may be transferred to the bottom chassis 70 to a side of the PCB 62 in addition to the bottom chassis 70 behind the PCB 62. Heat transferred to the bottom chassis 70 to the side of the PCB 62 may also be transferred upward to the adjacent top chassis 10. As a result, the temperature of the top chassis 10 may rise due to heat transferred from the bottom chassis 70.

In the display device 1, the longer a time at which the display device 1 displays an image, the higher the temperature of the top chassis 10, which may cause a problem related to safety.

Hereinafter, a structure for preventing a rise in the temperature of the top chassis 10 of the display device 1 according to one or more exemplary embodiments will be described in detail with reference to the drawings.

Figure 3:
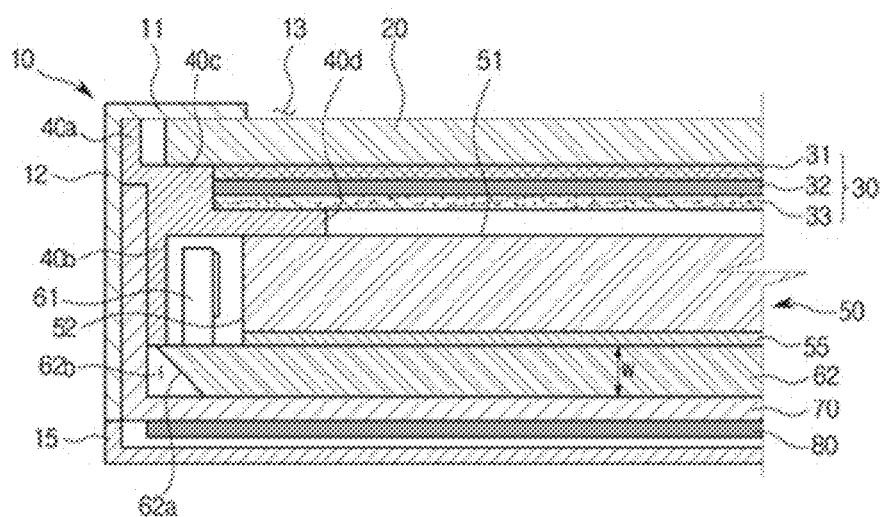
FIG. 3 is a cross-sectional view illustrating a part of the display device of FIG. 1, in accordance with a first exemplary embodiment.

FIG. 3 is a cross-sectional view illustrating a part of the display device 1 of FIG. 1, in accordance with a first exemplary embodiment.

Referring to FIG. 3, an incline surface 62a may be formed on at least one side of the PCB 62 of a display device 1 according to the first exemplary embodiment. The incline surface 62a may be formed when the side of the PCB 62 is cut. The incline surface 62a may be formed at the side of the PCB 62 to which the LEDs 61 are adjacent. An air gap 62*b* may be formed between the PCB 62 and the bottom chassis 70 through the incline surface 62*a*.

As the incline of the incline surface 62*a* approaches the bottom surface 72 of the bottom chassis 70, a distance between a bottom side 71 of the bottom chassis 70 and the incline surface 62*a* of the PCB 62 may increase. The area of one surface placed in front of the PCB 62 may be larger than the area of the other surface placed behind the PCB 62.

The air gap 62*b* may be formed between the incline surface 62*a* of the PCB 62 and the bottom chassis 70. The air gap 62*b* may be a space formed by the incline surface 62*a* of the PCB 62, the bottom sides 71 of the bottom chassis 70, and the bottom surface 72 of the bottom chassis 70.

The air gap 62*b* is formed so that heat transferred to the PCB 62 from the LEDs 61 can be prevented from being transferred to the top chassis 10 through the bottom sides 71 of the bottom chassis 70. That is, the air gap 62*b* is formed so that heat of the PCB 62 can be prevented from being conducted to the top chassis 10 through the bottom sides 71.

The PCB 62 may be provided so as to not contact the bottom sides 71 of the bottom chassis 70. Thus, heat transferred to the PCB 62 can be prevented from being transferred to the top chassis 10 through the bottom sides 71.

A thickness w of the PCB 62 according to the present exemplary embodiment may be larger than a thickness of a related art PCB. For example, the thickness w of the PCB 62 may be in the range of 2 mm to 3.2 mm. The PCB 62 may be manufactured of a metal material having good thermal conductivity, such as aluminum or copper.

As described above, a route in which heat generated in the LEDs 61 is transferred to the top chassis 10 can be blocked or disconnected so that the temperature of the top chassis 10 can be prevented from rising. Heat generated in the LEDs 61 may be transferred to the PCB 62, and the heat transferred to the PCB 62 may be transferred to the bottom surface 72 of the bottom chassis 70. The heat transferred to the bottom surface 72 of the bottom chassis 70 may be dissipated outward through the heat dissipation sheet 80.

Figure 4:
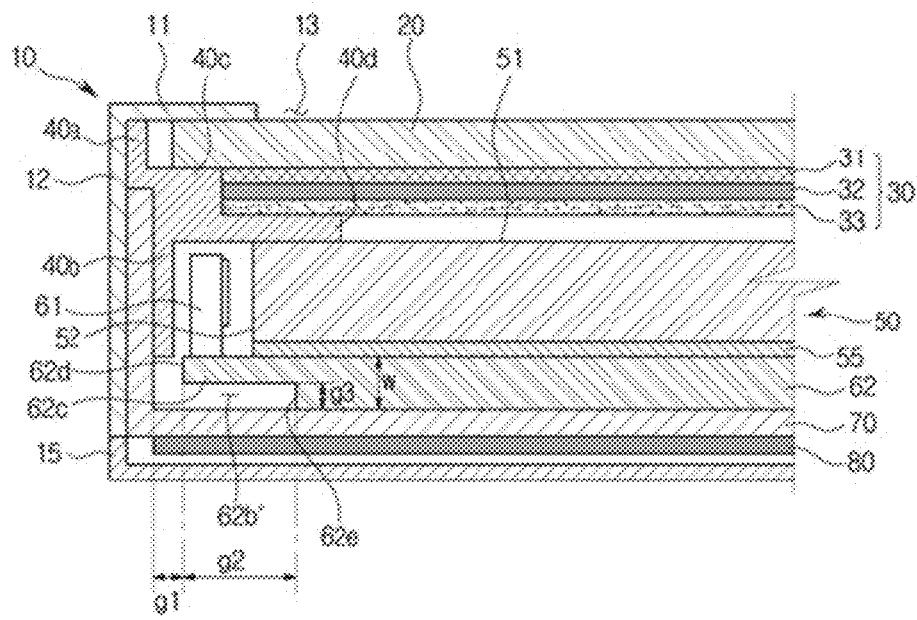
FIG. 4 is a cross-sectional view illustrating a part of the display device of FIG. 1, in accordance with a second exemplary embodiment.

FIG. 4 is a cross-sectional view illustrating a part of the display device of FIG. 1, in accordance with a second exemplary embodiment.

Referring to FIG. 4, at least one side of the PCB 62 of a display device 1 according to the second exemplary embodiment may be formed to be stepped so that an air gap 62*b*' can be formed. A part of a side of the PCB 62 may extend and may form a step height relative to another part of the side of the PCB 62.

For example, an extension portion 62*c* formed by extending a part of the side of the PCB 62 may be provided at the side of the PCB 62. A front surface (i.e., a surface facing the display panel 20) of the extension portion 62*c* may be provided as the same plane as that of the front surface of the PCB 62. As described above, the extension portion 62*c* may be formed a side of the PCB 62, and a step height between the extension portion 62*c* and another part of the side of the PCB 62 may be formed. A plurality of LEDs 61 may be mounted on the front surface of the extension portion 62*c*.

Hereinafter, a side surface of the extension portion 62*c* may be referred to as a first side surface 62*d*. A side surface of the other part of the PCB 62 that forms a step height with the extension portion 62*c* may be referred to as a second side surface 62*e*. The second side surface 62*e* may be behind (i.e., farther from the display panel 20) the first side surface 62*d*.

The air gap 62*b*' may be formed between at least one side of the PCB 62 and the bottom chassis 70. In detail, an empty space may be formed by the extension portion 62*c*, the bottom sides 71 of the bottom chassis 70, the bottom surface 72 of the bottom chassis 70, and the second side surface 62*e* so that the air gap 62*b*' can be formed. The air gap 62*b*' may be formed between the bottom chassis 70 and the extension portion 62*c*.

The sides of the PCB 62 may be provided so as to not contact the bottom sides 71 of the bottom chassis 70. In detail, the first side surface 62*d* may be provided to be spaced apart from a bottom side 71 by a predetermined gap and so as to not contact each other.

For example, a distance g1 between the bottom side 71 and the first side surface 62*d* may be about 0.5 mm. A distance g2 between the first side surface 62*d* and the second side surface 62*e* may be 1.5 mm or more. A length g3 in forward/backward directions of the second side surface 62*e* (i.e., a thickness of the other part of the PCB 62) may be 30% or more of the thickness w of the PCB 62. The thickness w of the PCB 62 may be in the range of 2.0 mm to 3.2 mm.

Even in the PCB 62 included in the display device 1 according to the second exemplary embodiment, similarly to the first exemplary embodiment, the thickness w of the PCB 62 may be larger than the thickness of the related art PCB.

As described above, the air gap 62*b*' is formed so that heat transferred to the PCB 62 from the LEDs 61 can be prevented from being transferred to the top chassis 10 through the bottom sides 71. Since the first side surface 62*d* does not contact the bottom sides 71 of the bottom chassis 70, heat of the PCB 62 can be prevented from being conducted to the top chassis 10 through the bottom sides 71.

Figure 5:
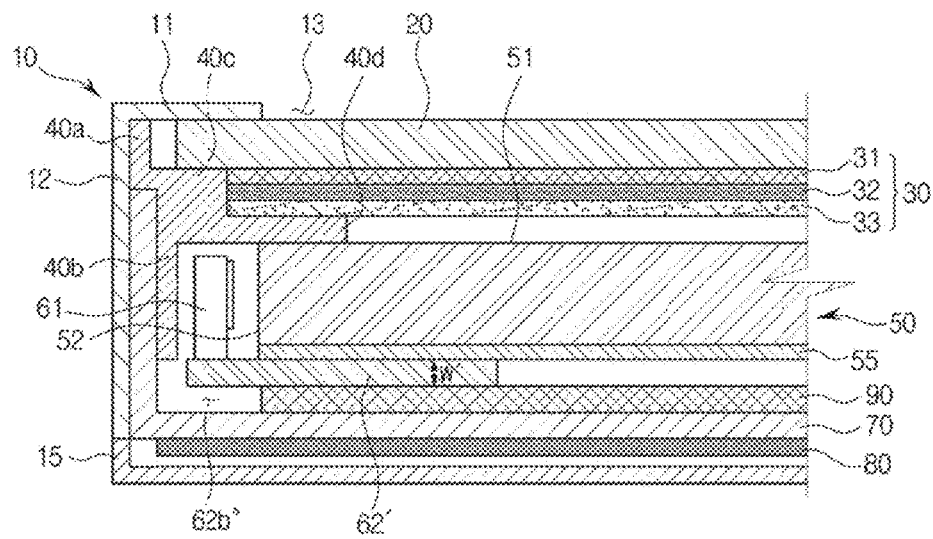
FIG. 5 is a cross-sectional view illustrating a part of the display device of FIG. 1, in accordance with a third exemplary embodiment.

FIG. 5 is a cross-sectional view illustrating a part of the display device of FIG. 1, in accordance with a third exemplary embodiment.

Referring to FIG. 5, a display device 1 according to the third exemplary embodiment may further include a heat sink 90. The heat sink 90 may be placed behind a PCB 62', i.e., farther from the display panel 20. The heat sink 90 may be placed between the PCB 62' and the bottom surface 72 of the bottom chassis 70.

A thickness w' of the PCB 62' according to the third exemplary embodiment may be smaller than the thickness w of the PCB 62 included in the display device 1 according to the first exemplary embodiment or the second exemplary embodiment. The PCB 62' according to the third exemplary embodiment may also be a PCB having a larger thickness than that of the related art PCB, like in the first exemplary embodiment and the second exemplary embodiment.

An air gap 62*b*'' may be formed between at least one side of the PCB 62' and the bottom chassis 70. The heat sink 90 may be disposed to face a partial bottom surface of the PCB 62', and the air gap 62*b*'' may be formed by sides of the heat sink 90, at least one side of the PCB 62', and the bottom chassis 70. Sides of the PCB 62' may be provided to not contact the bottom sides 71 of the bottom chassis 70. Furthermore, at least a portion of a front surface (i.e., a surface facing the display panel 20) of the heat sink 90 may not overlap with the PCB 62', as illustrated, although it is understood that one or more other exemplary embodiments are not limited thereto.

In the display device 1 according to the third exemplary embodiment, although heat generated in the LEDs 61 is transferred to the PCB 62', heat can be prevented from being transferred to the bottom sides 71 of the bottom chassis 70 through the air gap 62*b*''. Heat transferred to the PCB 62' from the LEDs 61 can be absorbed by the heat sink 90 placed behind the PCB 62', and heat of the PCB 62' can be efficiently dissipated. Heat absorbed by the heat sink 90 can be dissipated to the outside through the bottom surface 72 of the bottom chassis 70 and the heat dissipation sheet 80.

As described above, the air gap 62b" is formed so that heat transferred to the PCB 62' from the LEDs 61 can be prevented from being transferred to the top chassis 10 through the bottom sides 71. The heat sink 90 is placed behind the PCB 62' so that heat of the PCB 62' can be more effectively dissipated to the rear of the display device 1 and a large amount of heat can be prevented from being transferred to the top chassis 10.

Meanwhile, the heat sink 90 may be also applied to the display device according to the first exemplary embodiment or the second exemplary embodiment. For example, the heat sink 90 may be placed behind the PCB 62 according to the first exemplary embodiment so that heat of the PCB 62 transferred from the LEDs 61 can be more effectively dissipated to the rear of the display device 1 through the bottom surface 72 of the bottom chassis 70 and the heat dissipation sheet 80. Furthermore, it is understood that, in one or more other exemplary embodiments, the heat sink 90 may overlap with an entirety of the bottom surface of the PCB 62', i.e., the front surface of the heat sink 90' may overlap with an entirety of the bottom surface of the PCB 62'.

Figure 6:
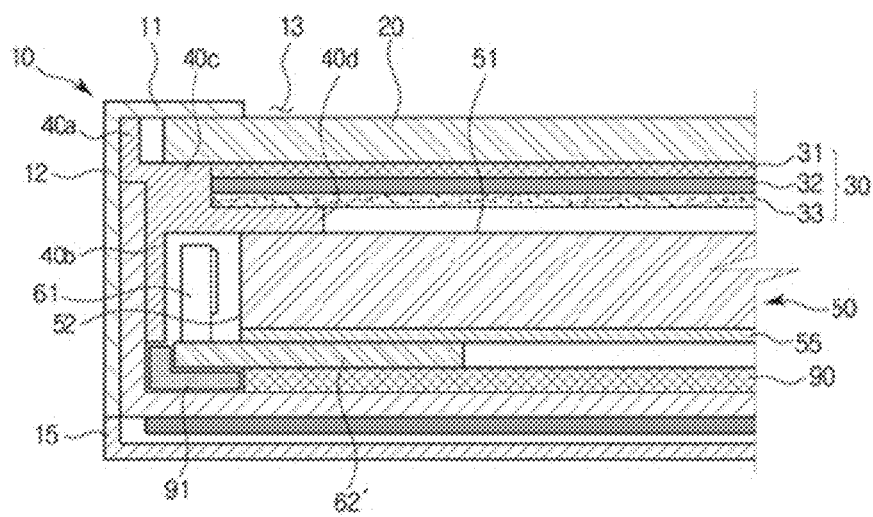
FIG. 6 is a cross-sectional view illustrating a part of the display device of FIG. 1, in accordance with a fourth exemplary embodiment.

FIG. 6 is a cross-sectional view illustrating a part of the display device of FIG. 1, in accordance with a fourth exemplary embodiment.

Referring to FIG. 6, a display device 1 according to the fourth exemplary embodiment may further include a spacer 91 that is disposed at the air gap 62b, 62b', or 62b" formed at the display device 1 and that is formed of a material having low thermal conductivity (e.g., lower than a thermal conductivity of at least one of the PCB 62 or 62' and the heat sink 90). The spacer 91 may be manufactured of a resin-based material, such as rubber or plastic.

The spacer 91 may be provided at the air gap 62b formed at the display device 1 according to the first exemplary embodiment, at the air gap 62b' formed at the display device 1 according to the second exemplary embodiment, or at the air gap 62b" formed at the display device 1 according to the third exemplary embodiment. The spacer 91 may be provided to correspond to the shape of the air gap 62b, 62b', or 62b". For example, in the present exemplary embodiment, the spacer 91 has an inverted L-shape.

Through the spacer 91 manufactured of a material having low thermal conductivity, heat generated in the LEDs 61 can be prevented from being transferred to the bottom sides 71 of the bottom chassis 70 through sides of the PCB 62 or 62'.

The heat sink 90 may be provided behind the PCB 62 or 62'. Heat of the PCB 62 or 62' can be absorbed by the heat sink 90 so that the heat of the PCB 62 or 62' can be efficiently dissipated.

As described above, the spacer 91 having low thermal conductivity is provided at the air gap 62b, 62b', or 62b" so that heat of the PCB 62 or 62' transmitted from the LEDs 61 can be prevented from being transferred to the top chassis 10 through sides of the PCB 62 or 62' and the bottom chassis 70. The heat sink 90 may be provided behind the PCB 62 or 62' so that heat of the PCB 62 or 62' can be more effectively dissipated to the rear of the display device 1 and a large amount of heat can be prevented from being transferred to the top chassis 10.

Figure 7:
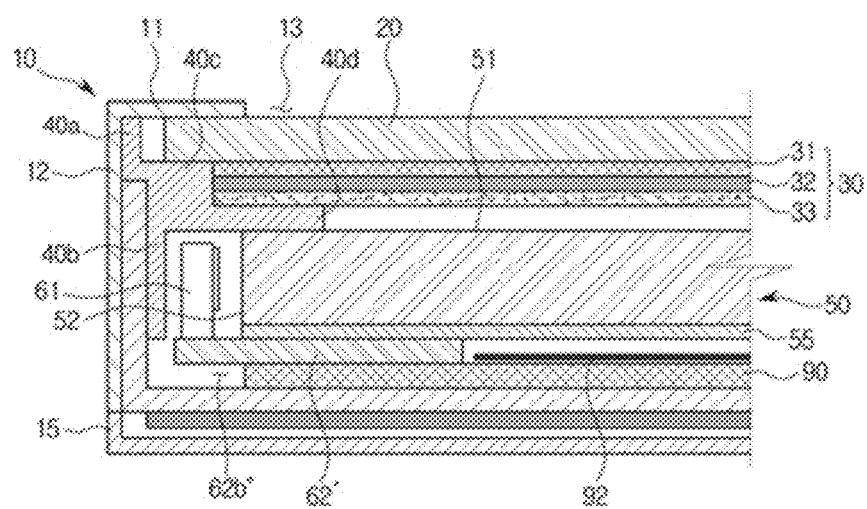
FIG. 7 is a cross-sectional view illustrating a part of the display device of FIG. 1, in accordance with a fifth exemplary embodiment.

FIG. 7 is a cross-sectional view illustrating a part of the display device of FIG. 1, in accordance with a fifth exemplary embodiment.

Referring to FIG. 7, a display device 1 according to the fifth exemplary embodiment may further include a heat reflection coating layer 92 that is formed on a front surface (i.e., a surface facing the display panel 20) of the heat sink 90. The display device 1 according to the fifth exemplary embodiment may include a PCB 62' having a smaller thickness than that of the PCB 62 according to the first exemplary embodiment and the second exemplary embodiment, similarly to the display device 1 according to the fourth exemplary embodiment.

A heat sink 90 may be provided behind the PCB 62'. A part of the front surface of the heat sink 90 may be provided to overlap with at least a part of a rear surface of the PCB 62'. The heat reflection coating layer 92 may be provided on another part of the front surface of the heat sink 90 that does not overlap with the PCB 62'. Heat absorbed by the heat sink 90 may be reflected toward the display panel 20 through the heat reflection coating layer 92.

Heat absorbed by the heat sink 90 from the PCB 62' is reflected toward the display panel 20 through the heat reflection coating layer 92 so that heat of the PCB 62' can be more efficiently dissipated. Heat-dissipation of the PCB 62' is efficiently performed so that a large amount of heat can be prevented from being transferred to the top chassis 10.

The heat reflection coating layer 92 may be also (or alternatively) provided at a front surface of the PCB 62 according to the first exemplary embodiment or the second exemplary embodiment or at a front surface of the heat sink 90 and/or a front surface of the PCB 62' according to the third exemplary embodiment or the fourth exemplary embodiment.

As described above, the air gap 62b, 62b', or 62b" is formed between the PCB 62 or 62' and the bottom chassis 70 so that heat generated in the LEDs 61 can be prevented from being transferred to the bottom chassis 70 through the PCB 62 or 62'. Thus, heat may also not be transferred to the top chassis 10 that contacts an outer side surface of the bottom chassis 70. A spacer 91 formed of a material having low thermal conductivity may be provided at the air gap 62b, 62b', or 62b". Through the spacer 91, heat of the PCB 62 or 62' can be effectively prevented from being transferred to the bottom chassis 70.

Also, through a configuration, such as the heat sink 90 or the heat reflection coating layer 92, heat of the PCB 62 or 62' may be dissipated to the rear or front of the display device 1 so that the PCB 62 or 62' can be prevented from being at a high temperature. The PCB 62 or 62' is prevented from being at a high temperature and a large amount of heat can be prevented from being transferred to the top chassis 10 through the bottom chassis 70.

As described above, the top chassis 10 is prevented from being at a high temperature due to a large amount of heat so that the occurrence of a safety accident and poor quality of the display device 1 can be prevented.

As described above, in a display device according to one or more exemplary embodiments, heat generated in LEDs can be prevented from being excessively transferred to a top chassis so that the occurrence of a safety accident and poor quality of the display device 1 can be prevented.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display device comprising:
a display panel on which an image is formed;
a top chassis in front of the display panel and having an opening through which the display panel is exposed;
a plurality of light emitting diodes (LEDs) configured to provide light to the display panel;
a printed circuit board (PCB) on which the plurality of LEDs are mounted; and
a bottom chassis behind an entirety of the PCB,
wherein the PCB and the bottom chassis are arranged such that an air gap is between the PCB and an inner side surface of the bottom chassis,
wherein a side of the PCB that faces the inner side surface of the bottom chassis comprises an extension portion that extends laterally toward the inner side surface of the bottom chassis, and another portion that is farther from the inner side surface of the bottom chassis than the extension portion, and which forms a step with the extension portion parallel to a side surface of the PCB that faces the inner side surface of the bottom chassis,
wherein the plurality of LEDs are mounted on a front surface of the extension portion that faces the display panel, and
wherein the first surface of the extension portion is in the same plane as the PCB.

2. The display device of claim 1, wherein at least one side of the PCB facing the inner side surface of the bottom chassis is spaced apart from the inner side surface of the bottom chassis.

3. The display device of claim 1, wherein an incline surface is formed on at least one side of the PCB, and the air gap is between the bottom chassis and the incline surface.

4. The display device of claim 1, wherein a side surface of the extension portion that faces the inner side surface of the bottom chassis is spaced apart from the inner side surface of the bottom chassis.

5. The display device of claim 1, further comprising a spacer in the air gap and formed of an insulating material.

6. The display device of claim 5, wherein a thermal conductivity of the spacer is less than a thermal conductivity of the PCB.

7. The display device of claim 1, further comprising a heat sink behind the PCB, farther from the display panel than the PCB.

8. The display device of claim 7, wherein a rear surface of the PCB facing the heat sink comprises a portion that does not overlap with the heat sink, and the air gap is between the bottom chassis and the portion of the rear surface of the PCB.

9. The display device of claim 7, further comprising a heat reflection coating layer at a front surface of the heat sink that faces the display panel.

10. The display device of claim 1, wherein the plurality of LEDs emit the light in a direction parallel to a front surface of the PCB on which the plurality of LEDs are mounted.

11. A display device comprising:
a display panel on which an image is formed;
a plurality of light emitting diodes (LEDs) to a left side or a right side of a rear of the display panel and configured to provide light to the display panel;
a printed circuit board (PCB) on which the plurality of LEDs are mounted;
a top chassis in front of the display panel and having an opening through which the display panel is exposed;
a bottom chassis behind an entirety of the PCB and contacting a portion of the top chassis; and
a heat dissipation sheet behind the bottom chassis,
wherein at least a portion of a side of the PCB that faces an inner side surface of the bottom chassis does not contact the inner side surface of the bottom chassis so that an air gap is formed between the inner side surface of the bottom chassis and the PCB,
wherein the side of the PCB that faces the inner side surface of the bottom chassis comprises an extension portion that extends laterally toward the inner side surface of the bottom chassis, and another portion that is farther from the inner side surface of the bottom chassis than the extension portion, and which forms a step with the extension portion parallel to a side surface of the PCB that faces the inner side surface of the bottom chassis,
wherein the plurality of LEDs are mounted on a front surface of the extension portion that faces the display panel, and
wherein the first surface of the extension portion is in the same plane as the PCB.

12. The display device of claim 11, further comprising a spacer in the air gap and formed of a resin material having low thermal conductivity.

13. The display device of claim 11, further comprising a heat sink behind the PCB, farther from the display panel than the PCB.

14. The display device of claim 11, wherein an incline surface is formed on the side of the PCB that faces the inner side surface of the bottom chassis, and the air gap is between the bottom chassis and the incline surface.

15. The display device of claim 11, wherein a side surface of the extension portion that faces the inner side surface of the bottom chassis is spaced apart from the inner side surface of the bottom chassis.

16. The display device of claim 11, further comprising a light guide panel comprising:
an incidence surface that faces the plurality of LEDs to receive the light emitted by the plurality of LEDs; and
an exit surface, perpendicular to the incidence surface and facing the display panel, to supply the received light to the display panel.

17. A display device comprising:
a plurality of light emitting diodes (LEDs) configured to provide light to the display panel;
a printed circuit board (PCB) on which the plurality of LEDs are mounted; and
a bottom chassis behind an entirety of the PCB,
wherein the PCB and the bottom chassis are arranged such that an air gap is between the PCB and an inner side surface of the bottom chassis,
wherein a side of the PCB that faces the inner side surface of the bottom chassis comprises an extension portion that extends laterally toward the inner side surface of the bottom chassis, and another portion that is farther from the inner side surface of the bottom chassis than the extension portion, and which forms a step with the extension portion parallel to a side surface of the PCB that faces the inner side surface of the bottom chassis,
wherein the plurality of LEDs emit the light in a direction parallel to a front surface of the PCB on which the plurality of LEDs are mounted, and
wherein the first surface of the extension portion is in the same plane as the PCB.

18. The display device of claim 17, wherein at least one side of the PCB facing the inner side surface of the bottom chassis is spaced apart from the inner side surface of the bottom chassis.

19. The display device of claim 17, wherein an incline surface is formed on at least one side of the PCB, and the air gap is between the bottom chassis and the incline surface.

20. The display device of claim 17, wherein a side surface of the extension portion that faces the inner side surface of the bottom chassis is spaced apart from the inner side surface of the bottom chassis.

21. The display device of claim 17, wherein the air gap is between the bottom chassis and a rear surface of the extension portion, opposite a front surface of the extension portion that faces the display panel.

22. The display device of claim 17, further comprising a spacer in the air gap and formed of an insulating material.

23. The display device of claim 22, wherein a thermal conductivity of the spacer is less than a thermal conductivity of the PCB.

24. The display device of claim 17, further comprising a heat dissipation sheet entirely behind the bottom chassis.

* * * * *